United States Patent [19]
Lusen et al.

[11] Patent Number: 5,555,918
[45] Date of Patent: Sep. 17, 1996

[54] METHOD OF MAKING SLEEVE WITH INTEGRAL LACING CORD

[75] Inventors: Leonard Lusen, Lansdale; Tammy S. Ebersole, Warminster, both of Pa.

[73] Assignee: Bentley-Harris Inc., Exton, Pa.

[21] Appl. No.: 518,533

[22] Filed: Aug. 23, 1995

Related U.S. Application Data

[62] Division of Ser. No. 184,877, Jan. 12, 1994, Pat. No. 5,467,802.

[51] Int. Cl.⁶ ..................................................... D03D 3/00
[52] U.S. Cl. ............................................................. 139/433
[58] Field of Search ........................... 139/385, 54, 432, 139/430, 434, 433

[56] References Cited

U.S. PATENT DOCUMENTS

| | | |
|---|---|---|
| 626,842 | 6/1899 | Palmer . |
| 698,490 | 4/1902 | Groebli . |
| 2,122,623 | 7/1938 | Rogers . |
| 2,166,420 | 7/1939 | Robertson . |
| 3,080,892 | 3/1963 | Plummer . |
| 3,095,908 | 7/1963 | Plummer . |
| 3,180,923 | 4/1965 | Gow et al. . |
| 3,457,966 | 7/1969 | Cujai . |
| 3,540,493 | 11/1970 | Tallman . |
| 3,571,863 | 3/1971 | Logan . |
| 3,627,903 | 12/1971 | Plummer . |
| 3,711,633 | 1/1973 | Ghirardi et al. . |
| 3,741,254 | 6/1973 | Clark ............................................ 139/2 |
| 3,861,015 | 1/1975 | Hooven . |
| 3,984,622 | 10/1976 | Ross . |
| 4,185,667 | 1/1980 | Kendrick . |
| 4,248,459 | 2/1981 | Pate et al. . |
| 4,384,167 | 5/1983 | Nestor . |
| 4,415,765 | 11/1983 | Iwasa et al. . |
| 4,607,667 | 8/1986 | Gibson . |
| 4,616,680 | 10/1986 | Lai ............................................ 139/304 |
| 4,735,836 | 4/1988 | Giebel et al. . |
| 4,745,239 | 5/1988 | Conrad . |
| 4,891,256 | 1/1990 | Kite, III et al. . |
| 4,942,499 | 7/1990 | Shibata et al. . |
| 4,974,798 | 12/1990 | Harding et al. . |
| 5,116,478 | 5/1995 | Tate et al. . |

FOREIGN PATENT DOCUMENTS 23597  1/1914  United Kingdom .

*Primary Examiner*—Andy Falik
*Attorney, Agent, or Firm*—Synnestvedt & Lechner

[57] ABSTRACT

Woven sleeving having integral tie cords for bundling and harnessing electrical cables and other elongated substrates is disclosed. The sleeving is woven by the method of displacing catch cords a fixed distance from the fabric selvages and raising the catch cords at predetermined intervals to effect a looping of the fill yarn at predetermined intervals. The fill yarn may extend directly from the selvage or from points spaced inwardly from the selvage so as to creat a tab area along the margin of the sleeve so that the sleeve margins overlap when the sleeve is fastened in place.

5 Claims, 2 Drawing Sheets

METHOD OF MAKING SLEEVE WITH INTEGRAL LACING CORD

RELATED APPLICATIONS

This is a divisional of application Ser. No. 07/184,877 filed on Jan. 21, 1994, U.S. Pat. No. 5,467,802.

FIELD OF THE INVENTION

This invention relates to protective sleeving for electrical conductors, pipes and other elongated substrates and methods of manufacture of such sleeving and, more particularly, to a method of making sleeving products formed by weaving and including integrally woven lacing cords for fastening the sleeving around a bundle of the elongated articles.

BACKGROUND OF THE INVENTION

There are numerous situations in which it is desirable to provide jacketing or sleeving for cables and piping and other articles as, for example, to provide protection against abrasion, for insulation or for the purpose of channeling a group of wires to prevent them from becoming tangled or snagged and broken when extended adjacent to moving machinery and for obvious purposes such as waterproofing or to organize them into easily identified groupings.

Typical sleeving products of the type referred to are braided, woven or knitted, depending upon the intended use, from materials such as polyester monofilaments and other engineered plastics or from bulky yarns made from materials such as glass fiber. Frequently, products constructed from monofilaments are formed with an open construction so that they provide protection against abrasion while allowing for circulation of air. Sleeving products woven, braided or knitted from bulky yarns formed of materials such as glass fiber or the like, either alone or in combination with monofilaments of synthetics or metal wires, are typically intended to be of a relatively closed construction so as to function as insulators.

For most applications, it is required that the sleeving be not only inexpensive and durable, but it must be relatively easy and inexpensive to install. Sleeving of the type described is frequently provided in tubular form and is axially slit so that it may be slipped over elongated bundles of articles. It is usual practice that when the axially slit product is applied, it is secured in place by tape and the use of ties or straps which are fastened at spaced intervals. The methods of application described involve a relatively high labor cost and a certain amount of inconvenience because of the need to have a supply of tape, ties or straps conveniently at hand.

SUMMARY AND OBJECTS OF THE INVENTION

The sleeving products made according to the method of the invention are formed of natural and/or synthetic fibrous materials including bulky yarns, yarns comprised of one or more monofilaments or wires.

In contrast to the prior art, the invention described herein provides wrap around woven sleeving with integrally woven lacing cords provided at spaced intervals so that the means for fastening the sleeving in place in always at hand. Since the cord may be an integral part of the fabric formed of the same fill yarn as the remainder of the fabric, sleeving formed according to the invention can be provided with integral lacing cord at substantially no incremental cost.

According to the invention, sleeving products are provided comprising interwoven warp and weft yarns which may be in monofilament or multifilament form and combinations thereof. In setting up the loom, catch cords are spaced in outwardly with respect to the selvages of the product being formed and are moved upwardly and downwardly by actuation of separate heddle harnesses to effect looping of the fill yarn around the catch cords at the desired intervals, thereby forming tie cords. According to the manipulation of the heddles, the tie cords may extend directly outwardly from the selvages or from between a predetermined number of warps inwardly from the selvages. The heddle harnesses may be manipulated so that the tie cord at one selvage of the fabric extends directly outwardly from the selvage, whereas the opposite end extends from a point inwardly from the selvage thereby allowing for the production of sleeving with overlapping edges when tied. Alternatively, both tie cords of a pair may project from the selveges in which case the sleeve, when tied, would have a generally tear-drop shaped configuration when wrapped and tied around a bundle and viewed in cross section.

With the foregoing in view, it is the object of the invention to provide relatively inexpensive sleeving for bundling elongated substrates in which the sleeving has integrally formed tie cords.

A further object of the invention is the provision of a woven sleeving for bundling elongated substrates in which the tie cords are fill yarns which extend alternatively from the selveges or from points spaced inwardly from the selveges.

A further object of the invention is a method of weaving sleeving material in which integrally woven tie cords are provided as a part of the weaving operation.

A still further object of the invention is a method of weaving sleeving material in which catch cords are spaced from the fabric selvages and are actuated to extend fill yarns from the selvages of the fabric at predetermined intervals to form tie cords at spaced integrals lengthwise of the sleeving material.

DETAILED DESCRIPTION OF THE ILLUSTRATIVE EMBODIMENT OF THE INVENTION

Figure 1:
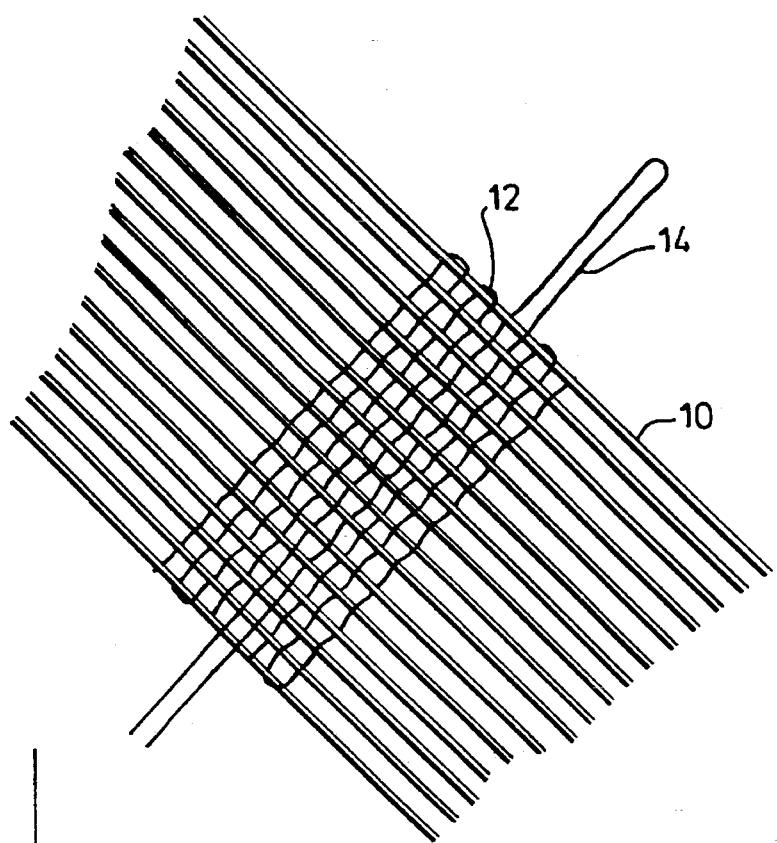
FIG. 1 is a schematic view in perspective showing a fragment of sleeving material formed according to the teachings of the present invention.

Attention is first directed to FIG. 1 which illustrates in schematic and simplified form a fragment of a fabric sleeve formed in accordance with the invention. As illustrated, the fabric is comprised of flexible warp yarns 10 and fill yarns 12 which are woven on a conventional box loom. In the weaving process, as understood by those in the art, the warps 10 are fed from spools at one end of the loom over warp rolls which extend in lengthwise, parallel relationship to one another through eyes located in heddles manipulated by harnesses which are selectively raised and lowered in order to produce the shed through which the fill yarn 12 is passed utilizing one or more shuttles, as explained below. The fill yarn 12 is moved transversely through the shed and on each pass, the fill yarn 12 is battened by a reed to form the fabric of FIG. 1. The loom may be a conventional box loom of a type well known in the art, such as is manufactured by Crompton & Knowles Weavers, Inc. or Draper. Preferably, the box loom is of the type having a multiple shuttle capability so that the loom has multiple filling capability under control of a box chain so as to allow for the use of two filling types. As understood by those having ordinary skill in this art, the shuttle for the body of the fabric is moved across the warp ends and the fill yarn is then beat up. The shuttle moves back to its box and the fill yarn is beat up again. When required, the second shuttle with the second type of fill yarn is then moved back and forth, the second fill yarn being beaten up on each pass of the shuttle as described above. The second shuttle can continue weaving or the first shuttle can be called into action under control of the box chain. It is to be understood that in the illustrative example of FIG. 1, it is preferred that the second shuttle is used whenever a tie cord is required, although a single shuttle may be used in carrying out the invention where the tie cord is to be the same yarn as the regular fill yarn.

Figure 2:
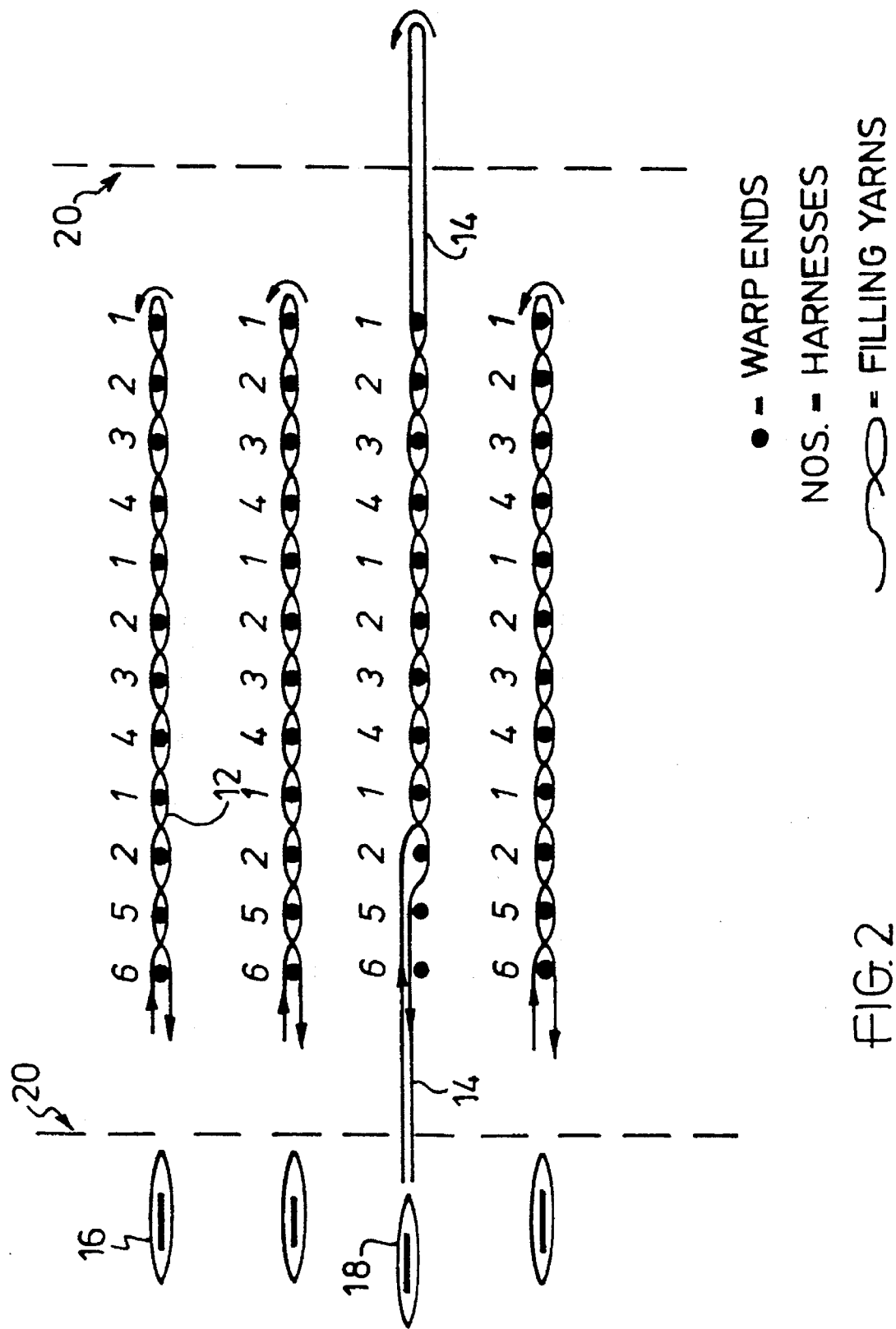
FIG. 2 is a schematic view illustrating the manner of manipulation of the loom harnesses in the weaving of fabric sleeving incorporating the principles of the invention.

In further explanation of the method of the invention, the tie cords 14 are produced in the manner schematically illustrated in FIG. 2. As schematically illustrated in FIG. 2, the warp yarns are represented as at 10 and the fill yarn at 12. The loom preferably has two shuttles, one represented by the numeral 16 and the other by numeral 18. The tie cords 14 are formed by disposing catch cords 20, represented by broken lines 16, at discrete intervals outwardly spaced a predetermined distance from each selvage. In constructing a fabric, the chain is built so that a predetermined number of picks are incorporated between the tie cords 14, thereby establishing a fixed distance between each pair of tie cords. At the point where tie cords are desired, the harness controlling the catch cords 16 lifts to the top of the warp shed for one pick before returning to its original position which causes the fill yarn to loop around the cord as the shuttle completes its pass and returns to the opposite side of the loom. The formation of a tie cord 14, as just described, can be seen upon reference to the showing at the right hand side of FIG. 2 which illustrates the tie cord 14 extending directly from the right hand selvage as viewed in the figure. It is understood that the length of the tie cord is selected according to the amount of cord necessary to effect a secure fastening of the sleeve and is determined by the spacing of the catch cord from the selvage.

FIG. 2 also illustrates the formation of a tie cord 14 which extends from a point spaced inwardly of the selvage. In further explanation of FIG. 2, the harnesses controlling the positioning of the warp ends are schematically represented by numbers 1–6 and the harness controlling the catch cords 16 is indicated by the reference character 7. For the warp ends used in forming the portion of the fabric to the right of the area where the tie cord 14 is intended to extend, the harnesses are manipulated in conventional fashion to raise and lower alternate warp ends. In the region of the fabric to the left of the point where the tie cord 14 is intended to extend, harnesses 5 and 6 operate in conjunction with harnesses 1–4 to provide the same weaving pattern as harnesses 1–4 in the intervals between the tie cords. When it is desired that a tie cord be drawn out of the body of the fabric thereby creating a tab area, the box chain is set so that the harnesses 5 and 6 are not raised, allowing the tie cord 14 to float over those warp ends controlled by the harnesses controlling the warps in the tab area. As in forming the right hand tie cord loop, a separate harness represented by the numeral 7 controls the raising and lowering of the left hand catch cord so that the shuttle loops around the catch cord a predetermined distance from the left hand selvage. Once the tie cord has been formed, the original fabric pattern is reestablished and continues for the number of picks required to establish the predetermined distance between pairs of tie cords.

Figure 3:
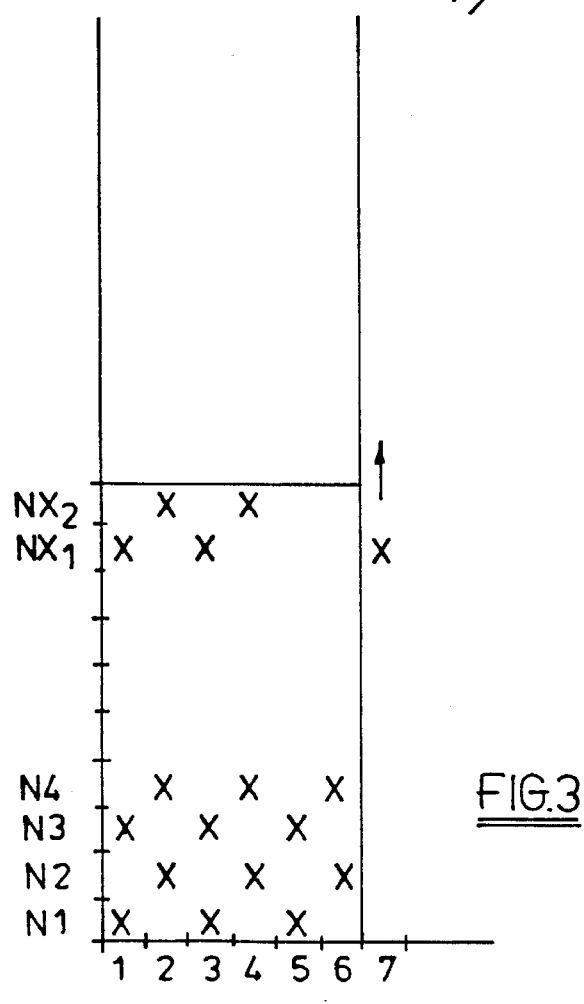
FIG. 3 is a further schematic view of the pattern chain operation creation of a tab area in the weaving of fabric sleeving formed in accordance with the present invention.

FIG. 3 is a representative diagrammatic sectional view of pattern chain illustrating the concept of weaving a sleeving having overlapping or tab areas. In FIG. 3, the critical picks are the picks identified as $Nx_1$ and $Nx_2$. As illustrated in FIG. 3, the picks $Nx_1$ and $Nx_2$ are the picks which lift the catch cords 16 so that the fill yarn catches it and forms a loop. As indicated above, the picks $Nx_1$ and $Nx_2$ are inserted at locations depending upon the desired spacing between tie cords. The basic pattern illustrated is for illustrative purposes only, and it should be understood that other weaving patterns may be employed and that the spacing and pattern illustrated is provided for purposes of illustrating the invention.

As indicated above, various textile yarns of both multifilament and monofilament form may be used in weaving sleeves according to the present invention. A preferred monofilament material is a polyester monofilament yarn. Where additional abrasion resistance is required, the monofilament may be nylon. Bulky yarns made of glass fiber or other textile materials may also be employed. In the illustrative embodiment, cotton yarns were utilized for the warp yarns, the fill yarns and the tie cords, although it is contemplated that synthetic resinous materials or other materials will be employed, depending upon the application for which the sleeve material is intended.

What is claimed is:

1. A method of weaving the cords on a fabric sleeve of substantially rectangular shape, said sleeve being flexible and being adapted to be wrapped around a bundle of elongated substrates, said method comprising:

weaving the sleeve on a shuttle loom from flexible warp and fill yarn;

displacing catch cords laterally outwardly preselected distances from the selvages of the sleeve fabric being woven; and lifting the catch cords in timed relation to the picking of preselected fill yarns to effect a looping of the preselected fill yarn around the catch cords, thereby creating a tie cord extended from the fabric selvage by an amount equal to the displacement of the catch cords.

2. A method according to claim 1, the method further comprising forming a tab area between the selvage and the point where the tie cord extends from the fabric by suppressing the lifting of the warp yarns in the tab area to cause a preselected fill yarn to float over the suppressed warp yarns.

3. A method according to claim 1, wherein the method further comprises using a separate shuttle of a multiple shuttle loom for passing a preselected fill yarn.

4. A method according to claim 3, wherein the method further comprises using as the preselected fill yarn a yarn different from the balance of the fill yarn comprising the fabric.

5. A method according to claim 4, wherein the preselected fill yarn used is a yarn having a different diameter from the rest of the fill yarn.

* * * * *

UNITED STATES PATENT AND TRADEMARK OFFICE
CERTIFICATE OF CORRECTION

PATENT NO. : 5,555,918

DATED : September 17, 1996

INVENTOR(S) : Lusen et al

It is certified that error appears in the above-indentified patent and that said Letters Patent is hereby corrected as shown below:

On the cover page in the Related U.S. Application Data section, change "Jan. 12, 1994" to --Jan. 21, 1994--

Column 1, line 5, change "07/184,877" to --08/184,877--

Signed and Sealed this

Fifteenth Day of July, 1997

Attest:

BRUCE LEHMAN

Attesting Officer

Commissioner of Patents and Trademarks